United States Patent [19]

Bauer

[11] Patent Number: 5,431,447
[45] Date of Patent: Jul. 11, 1995

[54] ADJUSTABLE ENERGY ABSORBING DEVICE FOR USE IN A VEHICLE SEAT BELT RESTRAINT SYSTEM

[75] Inventor: Barney J. Bauer, Fenton, Mich.
[73] Assignee: TRW Vehicle Safety Systems Inc., Lyndhurst, Ohio
[21] Appl. No.: 327,987
[22] Filed: Oct. 24, 1994
[51] Int. Cl.⁶ .............................................. B60R 22/28
[52] U.S. Cl. ..................................... 280/805; 188/375
[58] Field of Search ............................. 280/805, 801.1; 188/375, 374, 371; 297/472, 470

[56] References Cited

U.S. PATENT DOCUMENTS

| | | | |
|---|---|---|---|
| 3,232,383 | 2/1966 | Moberg | 280/805 |
| 3,438,674 | 4/1969 | Radke et al. | 280/805 |
| 4,273,361 | 6/1981 | Takei et al. | 280/805 |
| 5,216,607 | 6/1993 | Diller et al. | 364/424.05 |

FOREIGN PATENT DOCUMENTS

| | | | |
|---|---|---|---|
| 1105404 | 12/1955 | France | 188/375 |
| 905836 | 9/1962 | United Kingdom | 188/375 |

*Primary Examiner*—Karin L. Tyson
*Attorney, Agent, or Firm*—Tarolli, Sundheim & Covell

[57] ABSTRACT

An apparatus (10) comprises vehicle seat belt webbing (26) which is extensible about a vehicle occupant. A first member (60) is connectable to the vehicle and a second member (90) is connected to the belt webbing (26). An energy absorbing mechanism (70) disposed between the first and second members (60, 90) dissipates energy transferred to the belt webbing (26) due to movement of a vehicle occupant against the belt webbing (26) in response to vehicle deceleration. The mechanism (70) includes a cutter block (75) disposed on one of the members (60, 90) for cutting into the material of the other of the members when an occupant presses against the belt webbing (26) in response to vehicle deceleration with a force above a predetermined magnitude. A first sensor (102) senses an occupant characteristic, such as the weight of the occupant. A second sensor (104) senses another occupant characteristic, such as the location of the occupant. A third sensor (106) senses a vehicle collision characteristic, such as the crash severity of the vehicle collision. A microcomputer (100) is responsive to at least one of the sensors (102, 104, 106) and generates a control signal (84) to actuate a motor (80) to adjust the position of the cutter block (75) relative to the other of the first and second members (60, 90) to vary the amount of cutting force, and thus energy, when applied over a distance to be dissipated by the energy absorbing mechanism (70).

18 Claims, 3 Drawing Sheets

ADJUSTABLE ENERGY ABSORBING DEVICE FOR USE IN A VEHICLE SEAT BELT RESTRAINT SYSTEM

BACKGROUND OF THE INVENTION

1. Technical Field

The present invention relates to a vehicle occupant seat belt restraint system, and is particularly directed to an energy absorbing device for use in a vehicle occupant seat belt restraint system.

2. Background Art

Many different vehicle occupant seat belt restraint systems are known. A typical vehicle occupant seat belt restraint system includes lap and shoulder belt portions which extend around an occupant seated in a vehicle seat. When the vehicle experiences deceleration such as occurs in a frontal collision, the occupant continues to move in the direction of travel of the vehicle and presses against the lap and shoulder belt portions. If the deceleration is above the locking threshold of the seat belt system, the seat belt locks and the occupant presses against the lap and shoulder belt portions, and the lap and shoulder belt portions are tensioned. In a high energy crash, the tension in the lap and shoulder belt portions may cause excessive loads to be imparted to the occupant. Thus, it can be desirable to (i) allow the occupant to move as the occupant presses against the lap and shoulder belt portions and (ii) dissipate energy transferred into the lap and shoulder belt portions as a function of the occupant's movement.

SUMMARY OF THE INVENTION

In accordance with the present invention, vehicle seat belt webbing is extensible about a vehicle occupant. A first member is connectable to the vehicle, and a second member is connected to the seat belt webbing. An energy absorbing mechanism is disposed between the first and second members. The energy absorbing mechanism dissipates kinetic energy transferred to the seat belt webbing due to loading by the vehicle occupant. The kinetic energy is dissipated in the form of work. Work is proportional to a force applied over a distance. The resistance force resisting the kinetic energy of the occupant which is transferred to the seat belt webbing is a cutting force of a cutter cutting into a member connected with the seat belt webbing. The distance is the distance of movement of the member being cut which could be termed a cutting stroke.

Actuatable means, when actuated, varies the amount of resistance force of the energy absorbing mechanism. Sensing means senses at least one characteristic selected from an occupant characteristic, such as the weight or location of the vehicle occupant, and a vehicle collision characteristic, such as the crash severity of the vehicle collision. Control means responsive to the sensing means actuates the actuatable means to vary the amount of resistance force applied by the energy absorbing mechanism.

Preferably, the energy absorbing mechanism comprises a cutter disposed on one of the first and second members for cutting into the other one of the first and second members. The actuatable means comprises a slide assembly including inner surface means defining an inclined slot for supporting the cutter for relative sliding movement between the slide assembly and the cutter. The actuatable means also preferably comprises a motor for, when actuated, moving the slide assembly to adjust the position of the cutter in the inclined slot. When the position of the cutter in the inclined slot is adjusted, the position of the cutter relative to the other of the first and second members is adjusted. The control means includes a microcomputer which is responsive to the sensing means. The microcomputer generates a control signal which is applied to the motor to adjust the position of the cutter and thereby to vary the amount of resistance force to be applied by the energy absorbing mechanism.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
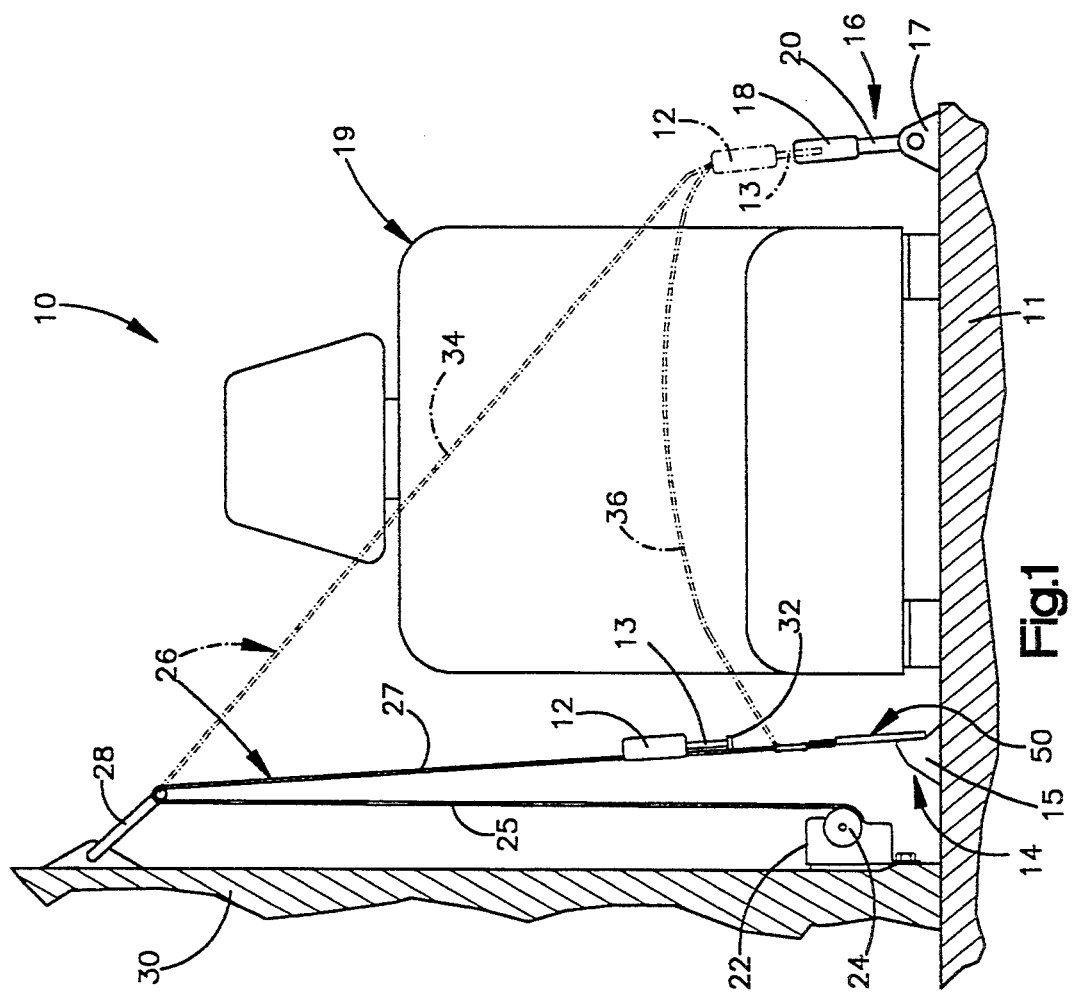
FIG. 1 is a schematic view of a vehicle seat belt restraint system embodying an adjustable energy absorbing device constructed in accordance with the present invention.

A three-point vehicle occupant seat belt restraint system 10 embodying the present invention is illustrated in FIG. 1. The seat belt restraint system 10 includes a seat belt retractor 22 which is connected to a vehicle 11. The seat belt retractor 22 includes a spool 24 with seat belt webbing 26 wound around the spool 24. A spring (not shown) biases the spool in a belt winding direction to wind the seat belt webbing 26 onto the spool 24. The seat belt webbing 26 is unwound from the spool 24 when forces sufficient to overcome the biasing force of the spring are applied to the seat belt webbing 26. The seat belt retractor 22 further includes a locking pawl mechanism (also not shown) which locks the spool 24 and prevents payout of the seat belt webbing from the spool 24 in the belt unwinding direction. The locking pawl mechanism is actuated when the seat belt retractor 22 is subjected to deceleration of at least a predetermined magnitude, such as occurs in a vehicle collision. The structure and operation of such a locking pawl mechanism are conventional and, therefore, will not be described herein.

The seat belt restraint system 10 also includes an outboard anchorage 14 located on the same side of a vehicle seat 19 as the seat belt retractor 22 and an inboard anchorage 16 on the opposite side of the vehicle seat 19. The inboard anchorage 16 includes a buckle 18 connected to the vehicle 11 by a suitable buckle connection 20. The buckle connection 20 is connected to a bracket 17 which, in turn, is fixedly connected to the vehicle 11. The outboard anchorage 14 includes an energy absorbing device 50. The energy absorbing device 50 is connected to a bracket 15 which, in turn, is fixedly connected to the vehicle 11. Alternatively, the energy absorbing device 50 could be used in association with buckle 18 as a substitute for buckle connection 20.

The seat belt webbing 26 extends up from the seat belt retractor 22 to a D-ring 28 which is mounted to the B pillar 30 of the vehicle 11. The seat belt webbing 26 extends through an opening of the D-ring 28 and then down to the outboard anchorage 14 where the end of the seat belt webbing 26 is securely fastened to the energy absorbing device 50.

A tongue assembly 12 includes a tongue portion 13 and is mounted on the seat belt webbing 26. The tongue assembly 12 is free to slide along the length of the seat belt webbing 26. A stop 32 is connected to the seat belt webbing 26 to block the tongue assembly 12 from sliding down the seat belt webbing 26 to the energy absorbing device 50.

The seat belt webbing 26 and the tongue assembly 12 are movable between a retracted position shown in solid lines in FIG. 1 and an extended position shown in broken lines in FIG. 1. When in the retracted position, the seat belt webbing 26 has portions 25, 27 (shown in solid lines in FIG. 1) which extend vertically along the B-pillar of the vehicle. The seat belt webbing 26 is moved to its extended position by a vehicle occupant seated on the vehicle seat 19 manually gripping the tongue assembly 12 and inserting the tongue portion 13 into the buckle 18. This results in seat belt webbing 26 being drawn from the spool 24. When in the extended position, a portion 34 (shown in broken lines in FIG. 1) of the seat belt webbing 26 extends across the torso of the occupant and another portion 36 (also shown in broken lines in FIG. 1) of the seat belt webbing 26 extends across the lap of the occupant.

Figure 2:
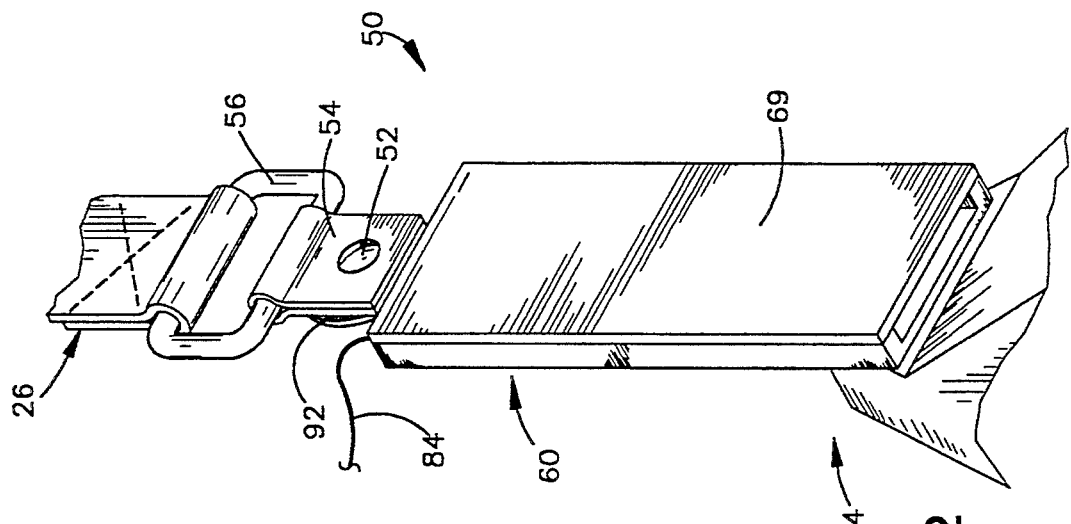
FIG. 2 is an enlarged perspective view of the adjustable energy absorbing device of FIG. 1.
Figure 3:
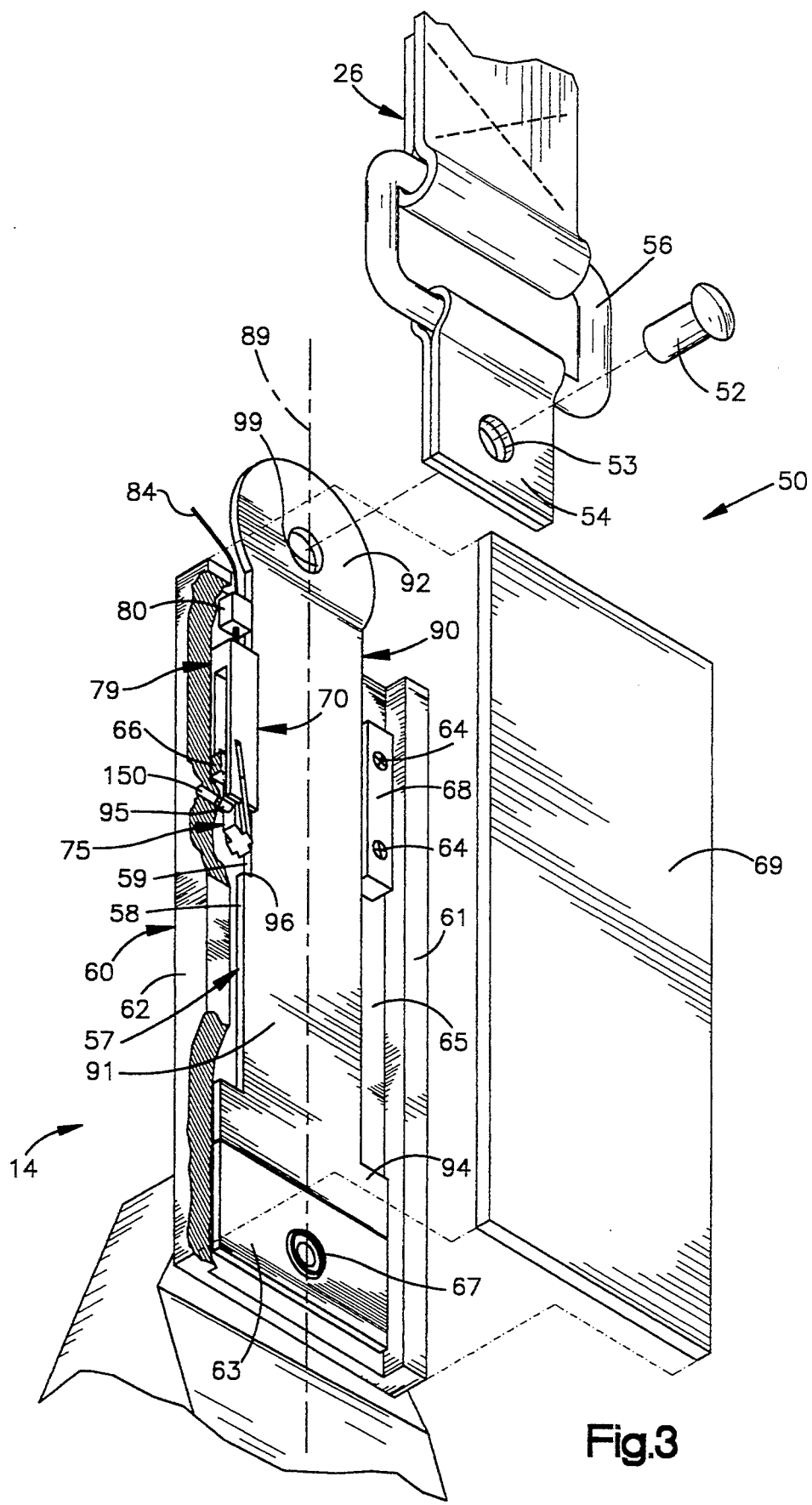
FIG. 3 is an exploded view of the adjustable energy absorbing device of FIG. 2.

Referring to FIGS. 2 and 3, the energy absorbing device 50 includes a housing member 60 having a flat base portion 65 and upstanding side wall portions 61, 62. A rectangular stop 63 is located between the side wall portions 61, 62 at one end of the housing member 60. The rectangular stop 63 and the housing member 60 are secured together to the bracket 15 using a suitable fastener, such as a rivet 67. A removable cover member 69 engages and is secured to the side wall portions 61, 62 by suitable fasteners (not shown) so that the cover member 69 is spaced from the base portion 65 of the housing member 60.

The energy absorbing device 50 further includes a plate member 90 which is disposed between the side wall portions 61, 62 of the housing member 60 and between the base portion 65 of the housing member 60 and the cover member 69. The plate member 90 has a pair of parallel major side surfaces 91, only one of which is shown in FIG. 3, and edge surfaces interconnecting the pair of major side surfaces 91. An edge surface portion 58 and an edge surface portion 59 interconnect the pair of major side surfaces 91. The two edge surface portions 58, 59 are parallel with each other and are located on the same side of the longitudinal axis 89 of the plate member 90. The edge surface portion 58 is located at a greater distance from the axis 89 than the edge surface portion 59. The plate member 90 thus includes a projecting portion 57 which includes the edge surface portion 58. The projecting portion 57 has an engagement surface 96 which extends perpendicular to and between the edge surface portions 58, 59 of the plate member 90.

The plate member 90 also includes an enlarged circular portion 92 disposed at one longitudinal end of the plate member 90 and an enlarged rectangular portion 94 disposed at the opposite longitudinal end of the plate member 90. The plate member 90 is slidable along its longitudinal axis 89 between the side wall portions 61, 62 relative to the housing member 60. The rectangular stop 63 secured to the housing member 60 positions the plate member 90 during assembly. The stop 63 is located to be engaged by the enlarged rectangular portion 94 when the portion 94 of the plate member 90 moves toward the stop 63 during assembly.

A guide member 68 is located adjacent one edge surface of the plate member 90, as shown in FIG. 3, and is secured to the housing member 60 using suitable fasteners, such as a pair of screws 64. The guide member 68 is located adjacent the edge surface of the plate member 90 opposite the edge surface portions 58, 59. The guide member 68 guides movement of the plate member 90 along its longitudinal axis 89. The guide member 68 also provides a limit to movement of the plate member 90 in a direction away from the stop 63 (the upward direction as viewed in FIG. 3). Specifically, the guide member 68 is located to be engaged by the enlarged rectangular portion 94 of the plate member 90 when the plate member 90 moves sufficiently far away from the stop 63.

The enlarged circular portion 92 of the plate member 90 has a hole 99 which aligns with a hole 53 in a bracket 54, as shown in FIG. 3. A rivet 52 extends through the two holes 53, 99 to secure the bracket 54 pivotally to the enlarged circular portion 92 of the plate member 90. The bracket 54 is wrapped around one side of a rectangular ring member 56, in a manner as shown in FIGS. 2 and 3, to secure the ring member 56 to the bracket 54. The seat belt webbing 26 is wrapped around the opposite side of the ring member 56 and sewn to itself, in a manner as shown in FIGS. 2 and 3 by the dotted lines which cross each other. Thus, the seat belt webbing 26 is secured to the ring member 56. Also, the seat belt webbing 26 is secured to the enlarged circular portion 92 of the plate member 90 through the interconnection of the ring member 56 and the bracket 54.

Figure 4:
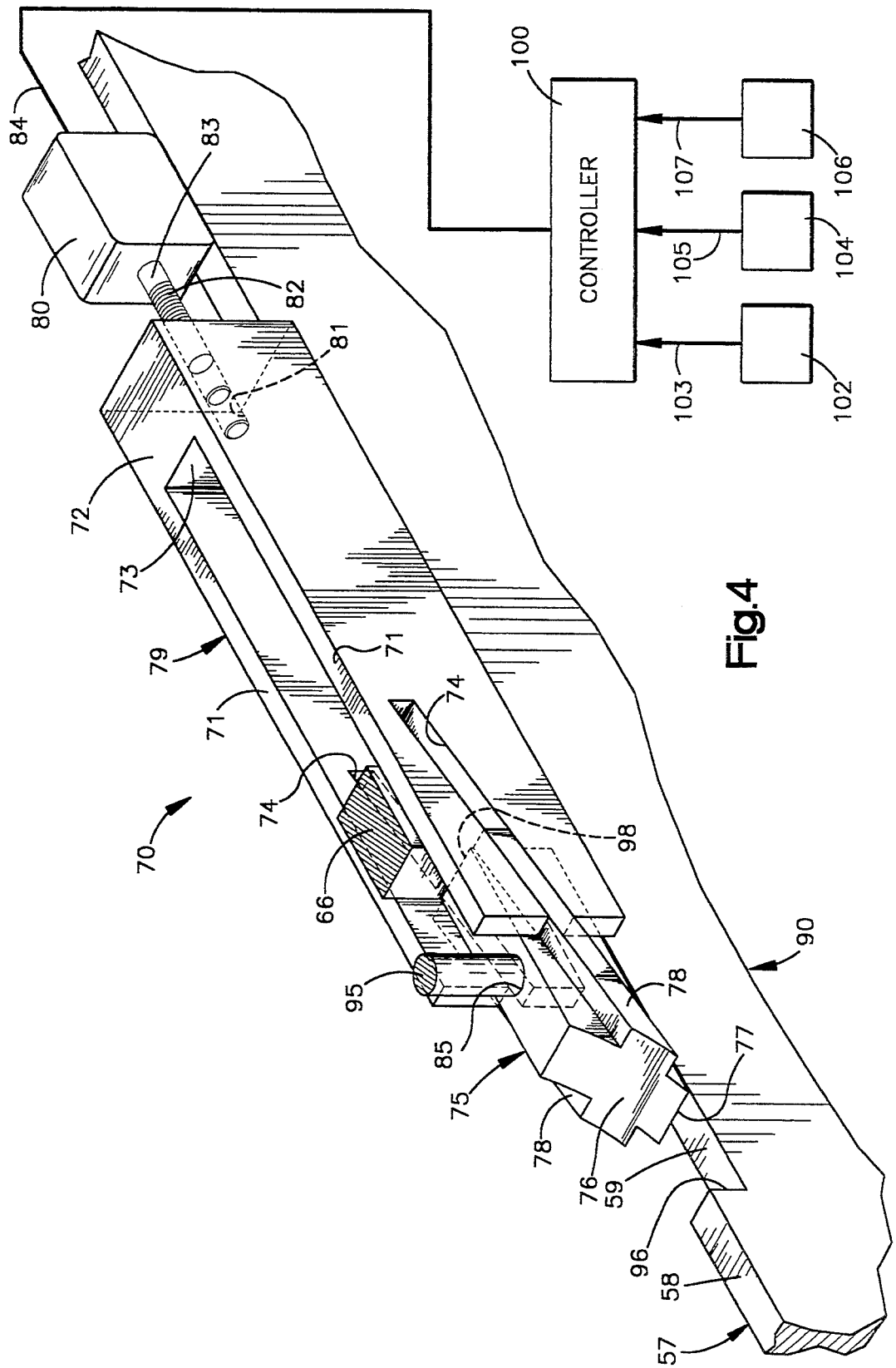
FIG. 4 is an enlarged view of a portion of FIG. 3 and showing some parts added and some parts removed.

Referring to FIGS. 3 and 4, a cutter assembly 70 is located adjacent to the side of the plate member 90 on which the projecting portion 57 of the plate member 90 is located. The cutter assembly 70 includes a cutter block 75. At one end, the cutter block 75 has a diagonal base surface 76 and a cutting edge 77 adjacent the base surface 76. The base surface 76 faces toward the engagement surface 96 of the projecting portion 57 of the plate member 90. The cutting edge 77 is located relative to the projecting portion 57 of the plate member 90 such that the cutting edge 77 is able to engage the engagement surface 96 and then cut into the material of the projecting portion 57 when the projecting portion 57 moves toward the cutting edge 77.

At the opposite end of the cutter block 75, the cutter block 75 has an end surface 98 (shown in broken lines in FIG. 4 only) which faces away from the engagement surface 96 of the projecting portion 57 of the plate member 90. The cutter block 75 further includes a pair of side projections 78 which extend along opposite sides of the cutter block 75 and between the base surface 76 and the end surface 98.

The cutter assembly 70 further includes a slide assembly 79 having a movable U-shaped guide member 72 and a positioning screw 82. The U-shaped guide member 72 includes a base portion 73 and two parallel and spaced apart legs 71 that extend from the base portion 73. A pair of slots 74 are formed in the legs 71 and extend longitudinally of the legs 71. The slots 74 intersect the free ends of the legs 71 and are inclined relative to the edge surface portion 59 of the plate member 90. The side projections 78 of the cutter block 75 are received in the inclined slots 74 of the U-shaped guide member 72, as shown in FIG. 4. The U-shaped guide member 72 has inner surface portions which define the inclined slots 74. These inner surface portions engage outer surface portions of the side projections 78 of the cutter block 75 to support the cutter block 75 for relative sliding movement along the inclined slots 74.

The housing member 60 has a guide pin 95 which is fixed in a hole 85 of the cutter block 75. The guide pin 95 is also slidably received in a hole 150 in the side wall portion 62 of the housing member 60. The guide pin 95 can not move transverse to the axis of the hole 150. The guide pin 95 is located intermediate the base surface 76 and the end surface 98 of the cutter block 75. The housing member 60 also has a fixed load carrying block 66 which is received in the open space between the legs 71 of the U-shaped guide member 72. The load carrying block 66 abuts the end surface 98 of the cutter block 75.

The U-shaped guide member 72 has a threaded hole 81 in the base portion 73 of the U-shaped guide member 72. The positioning screw 82 is screwed into the threaded hole 81. The positioning screw 82 is drivingly connected to an output shaft 83 of an electric motor 80.

When vehicle deceleration of at least a predetermined magnitude occurs, such as occurs in a vehicle collision, the seat belt retractor 22 locks the spool 24 to prevent payout of the seat belt webbing 26. The vehicle occupant continues to move relative to the vehicle 11, and thus has kinetic energy. The vehicle occupant presses against the seat belt webbing 26 and creates tension forces in the seat belt webbing 26. These tension forces are transmitted through the ring member 56 and the bracket 54 to the circular end portion 92 of the plate member 90, as best shown in FIG. 3.

When tension forces of at least a predetermined magnitude are transmitted to the plate member 90, the plate member 90 moves away from the stop 63 (upward as viewed in FIG. 3) of the housing member 60. The plate member 90 moves upward until the engagement surface 96 of the projecting portion 57 engages the cutting edge 77 of the cutter block 75. The plate member 90 could be located, however, such that the projecting portion 57 is in engagement with the cutting edge 77, and there is no movement of the plate member 90 required to engage the cutting edge 77.

As the plate member 90 moves upward with the engagement surface 96 engaging the cutting edge 77, the cutting edge 77 cuts into the material of the projecting portion 57. This cutting action constitutes a force applied over a cutting distance (stroke) and thus constitutes work. Thus, a portion of the kinetic energy of the vehicle occupant is transmitted through the seat belt webbing 26 and dissipated in the form of work by the action of the cutting edge 77 cutting into the material of the projecting portion 57 as the projecting portion moves.

The action of the cutting edge 77 cutting into the material of the projecting portion 57 generates forces which are transmitted through the cutter block 75 to the load carrying block 66. The load carrying block 66 resists movement of the cutter block 75. By using the load carrying block 66 to resist movement of the cutter block 75 due to the cutting action of the cutting edge 77 into the material of the projecting portion 57 of the plate member 90, only a small load, if any, is transmitted to the guide pin 95.

The amount of force produced by the cutting edge 77 cutting into the material of the projecting portion 57 depends upon the position of the cutter block 75 and thus the cutting edge 77 relative to the projecting portion 57. If the cutting edge 77 is more towards the edge surface portion 58 of the projecting portion 57, less material of the projecting portion 57 will be cut and, therefore, less force will be produced by the cutting action of the cutter block 75. Likewise, if the cutting edge 77 is more towards the edge surface portion 59 of the plate member 90, more material of the projecting portion 57 will be cut and, therefore, more force will be exerted by the cutting action of the cutter block 75.

It should be apparent that the amount of force exerted by the cutting action of the cutter block 75 depends upon the depth of the material removed from the projecting portion 57. The amount of force exerted by the cutting action of the cutter block 75 also depends upon other factors such as the specific material of the plate member 90, the thickness of the plate member 90, and the particular shape of the cutter block 75.

The position of the cutting edge 77 of the cutter block 75 relative to the edge surface portion 59 of the plate member 90 is adjustable. The motor 80 operates in one direction to move the cutting edge 77 away from the edge surface portion 59. Specifically, the shaft 83 of the motor 80 rotates in one direction to turn the positioning screw 82 so as to move the U-shaped guide member 72 toward the engagement surface 96 (the left, as viewed in FIG. 4). The movement of the guide member 72 towards the engagement surface 96 causes the cutter block 75 to move away from the edge surface portion 59 (in an upward direction as viewed in FIG. 4) along the guide pin 95 of the housing member 60. The cutter block 75 moves in the upward direction (as viewed in FIG. 4) and the guide pin 95 moves up in the hole 150 because the outer surfaces of the side projections 78 of the cutter block 75 are cammed upward along the inner surfaces in the inclined slots 74 of the U-shaped guide member 72 as the U-shaped guide member 72 moves toward the left.

Similarly, the motor 80 operates in the opposite direction to move the cutting edge 77 toward the side edge surface portion 59. Specifically, the shaft 83 of the motor 80 rotates in the opposite direction to turn the positioning screw 82 so as to move the U-shaped guide member 72 away from the engagement surface 96 (toward the right, as viewed in FIG. 4). The movement of the guide member 72 away from the engagement surface 96 causes the cutter block 75 to move toward the edge surface portion 59 (in a downward direction as viewed in FIG. 4) along the guide pin 95 of the housing member 60. The cutter block 75 moves in the downward direction (as viewed in FIG. 5) along the guide pin 95 because the outer surfaces of the side projections 78 of the cutter block 75 are cammed downward along the inner surfaces of the inclined slots 74 of the U-shaped guide member 72 as the U-shaped guide member 72 moves toward the right.

A controller 100, such as a microcomputer, provides a control signal on a line 84 to control operation of the motor 80. A first sensor mechanism 102 includes a sensor which senses a characteristic of an occupant, such as the weight of the occupant in the vehicle, and provides an electrical signal on line 103 indicative of the occupant characteristic. A second sensor mechanism 104 includes a sensor which senses another characteristic of the occupant, such as the location of the occupant in the vehicle, and provides an electrical signal on line 105 indicative of the occupant characteristic. A third sensor mechanism 106 includes a sensor arrangement which senses a vehicle collision characteristic, such as the crash severity of the vehicle collision, and provides an electrical signal on line 107 indicative of the vehicle collision characteristic. For example, the third sensor mechanism 106 may include a number of sensors located throughout different parts of the vehicle 11. If a vehicle collision occurs, at or above a predetermined threshold these sensors would cooperate to provide the signal on line 107 indicative of the crash severity of the vehicle collision. Such an arrangement of sensors is disclosed in U.S. Pat. No. 5,216,607, which is assigned to the assignee of the present application.

The microcomputer 100 monitors the electrical signals on lines 103, 105, 107 and generates the control signal on line 84. The control signal on line 84 is generated in accordance with a preprogrammed procedure stored in an internal memory of the microcomputer 100. Microcomputers are readily available in the commercial market. Their internal structure and operation are well known in the art and, therefore, the microcomputer 100 will not be described herein.

The control signal on line 84 which controls the motor 80 varies as a function of at least one of the electrical signals on lines 103, 105, 107 from the first, second, and third sensor mechanisms 102, 104, 106, respectively. The position of the cutting edge 77 of the cutter block 75 relative to the edge surface portion 59 of the plate member 90 varies, therefore, as a function of at least one of the electrical signals on lines 103, 105, 107. Thus, the amount of occupant kinetic energy dissipated in the form of work by the action of the cutting block 75 cutting into the material of the projecting portion 57 can be made to vary as a function of the weight and/or location of the vehicle occupant and/or the crash severity of the vehicle collision.

A number of advantages result from the cutter assembly 70 in accordance with the present invention. One advantage is that the resistive force which acts on the plate member 90 as the material of the plate member 90 is being cut is relatively linear throughout the entire range of movement of the plate member 90 relative to the housing member 60. The linear resistive force acts on the plate member 90 to resist movement of the plate member 90 in the upward direction (as viewed in FIG. 4) as the material of the plate member 90 is being cut. The linearity of the resistive force is relatively independent of the speed at which the material of the plate member 90 is being cut.

Since the resistive force acting on the plate member 90 is relatively linear as the material of the plate member 90 is being cut, the energy due to the cutting action is smoothly dissipated. Accordingly, a portion of the kinetic energy of a vehicle occupant pressing against shoulder and lap belt portions 34, 36 of the seat belt webbing 26 is smoothly dissipated. By smoothly dissipating some of the kinetic energy of the vehicle occupant, the occupant is allowed to move smoothly as the occupant presses against the shoulder and lap portions 34, 36 of the seat belt webbing 26. Thus, the peak forces applied to the occupant due to the tension of the seat belt webbing are reduced from the peak force values which would be experienced by the occupant if a portion of his kinetic energy was not converted to work by metal cutting.

Another advantage is that a vehicle occupant is provided with occupant restraint which is tailored in accordance with characteristics, such as the weight and/or location of a particular vehicle occupant and/or the crash severity of the vehicle collision.

From the above description of the invention, those skilled in the art to which the present invention relates will perceive improvements, changes and modifications. Such improvements, changes and modifications within the skill of the art to which the present invention relates are intended to be covered by the appended claims. For example, a pyrotechnic device could be used to adjust the cutter block 75 as a substitute for motor 80.

Having described the invention, the following is claimed:

1. An apparatus comprising:
   vehicle seat belt webbing which is extensible about a vehicle occupant;
   a first member connectable to a vehicle;
   a second member connected to said seat belt webbing;
   an energy absorbing mechanism disposed between said first and second members and for dissipating energy transferred to said seat belt webbing due to movement of a vehicle occupant against said seat belt webbing in response to vehicle deceleration of at least a predetermined magnitude;
   actuatable means for, when actuated, varying the amount of energy to be dissipated by said energy absorbing mechanism;
   sensing means for sensing at least one characteristic selected from an occupant characteristic and a vehicle collision characteristic; and
   control means responsive to said sensing means and for actuating said actuatable means to vary the amount of energy to be dissipated by said energy absorbing mechanism.

2. An apparatus according to claim 1 wherein said energy absorbing mechanism comprises cutting means disposed on one of said first and second members.

3. An apparatus according to claim 2 wherein said actuatable means comprises (i) a slide assembly including inner surface means defining an inclined slot for supporting said cutting means for sliding movement relative to said slide assembly and (ii) a motor for, when actuated, moving said slide assembly to adjust the position of said cutting means in said inclined slot and the position of said cutting means relative to said other member.

4. An apparatus according to claim 3 wherein said cutting means comprises a cutter block including (i) a cutting edge having a position adjustable relative to said other member and for cutting into the material of said other member upon said second member moving relative to said first member and (ii) outer surface means slidable along and cooperating with said inner surface means of said slide assembly to enable the position of said cutting edge to be adjusted relative to said other member.

5. An apparatus according to claim 3 wherein said slide assembly includes a movable guide member and a positioning screw and said motor includes a drive shaft drivingly connected to said positioning screw, said positioning screw being operatively connected to said guide member to adjust the position of said cutting means upon actuation of said motor.

6. An apparatus according to claim 5 further including a guide pin which guides movement of said cutting means toward and away from said other member.

7. An apparatus according to claim 6 wherein said one member comprises a load carrying block portion which engages said cutting means to resist movement of said cutting means as said cutting means cuts into the material of said other member.

8. An apparatus according to claim 1 wherein said sensing means includes a sensor which senses an occupant characteristic.

9. An apparatus according to claim 1 wherein said sensing means includes a sensor which senses the crash severity of a vehicle collision as a vehicle collision characteristic.

10. An apparatus according to claim 1 wherein said control means includes a microcomputer for generating a control signal which is applied to said actuatable means to actuate said actuatable means.

11. An apparatus comprising:
vehicle seat belt webbing which is extensible about a vehicle occupant;
a first member connectable to a vehicle;
a second member connected to said seat belt webbing and movable relative to said first member and moving relative to said first member when tension of at least a predetermined magnitude is applied to said seat belt webbing;
cutting means disposed on one of said first and second members for cutting into the material of the other of said first and second members upon said second member moving relative to said first member;
actuatable means for, when actuated, adjusting the position of said cutting means relative to said other member such that the extent of cutting by said cutting means into the material of said other member is varied upon said second member moving relative to said first member.

12. An apparatus according to claim 11 wherein said first member comprises a housing on which said cutting means is disposed.

13. An apparatus according to claim 12 wherein said second member comprises a plate including a portion having the material into which said cutting means cuts when said second member moves relative to said first member.

14. An apparatus according to claim 11 wherein said actuatable means comprises (i) a slide assembly including inner surface means defining an inclined slot for supporting said cutting means for relative sliding movement between said slide assembly and said cutting means and (ii) a motor for, when actuated, moving said slide assembly to adjust the position of said cutting means in said inclined slot and the position of said cutting means relative to said other member.

15. An apparatus according to claim 14 wherein said cutting means comprises a cutter block including (i) a cutting edge having a position adjustable relative to said other member and for cutting into the material of said other member upon said second member moving relative to said first member and (ii) outer surface means slidable along and cooperating with said inner surface means of said slide assembly to enable the position of said cutting edge to be adjusted relative to said other member.

16. An apparatus according to claim 14 wherein said slide assembly includes a movable guide member and a positioning screw and said motor includes a drive shaft drivingly connected to said positioning screw, said positioning screw being operatively connected to said guide member to adjust the position of said cutting means upon actuation of said motor.

17. An apparatus according to claim 16 wherein said one member comprises a guide pin portion which guides movement of said cutting means toward and away from said other member.

18. An apparatus according to claim 17 wherein said one member comprises a load carrying block portion which engages said cutting means to resist movement of said cutting means as said cutting means cuts into the material of said other member.

* * * * *